Dec. 12, 1950  G. W. JOHNSON  2,533,941
POULTRY SHACKLE
Filed Feb. 12, 1945
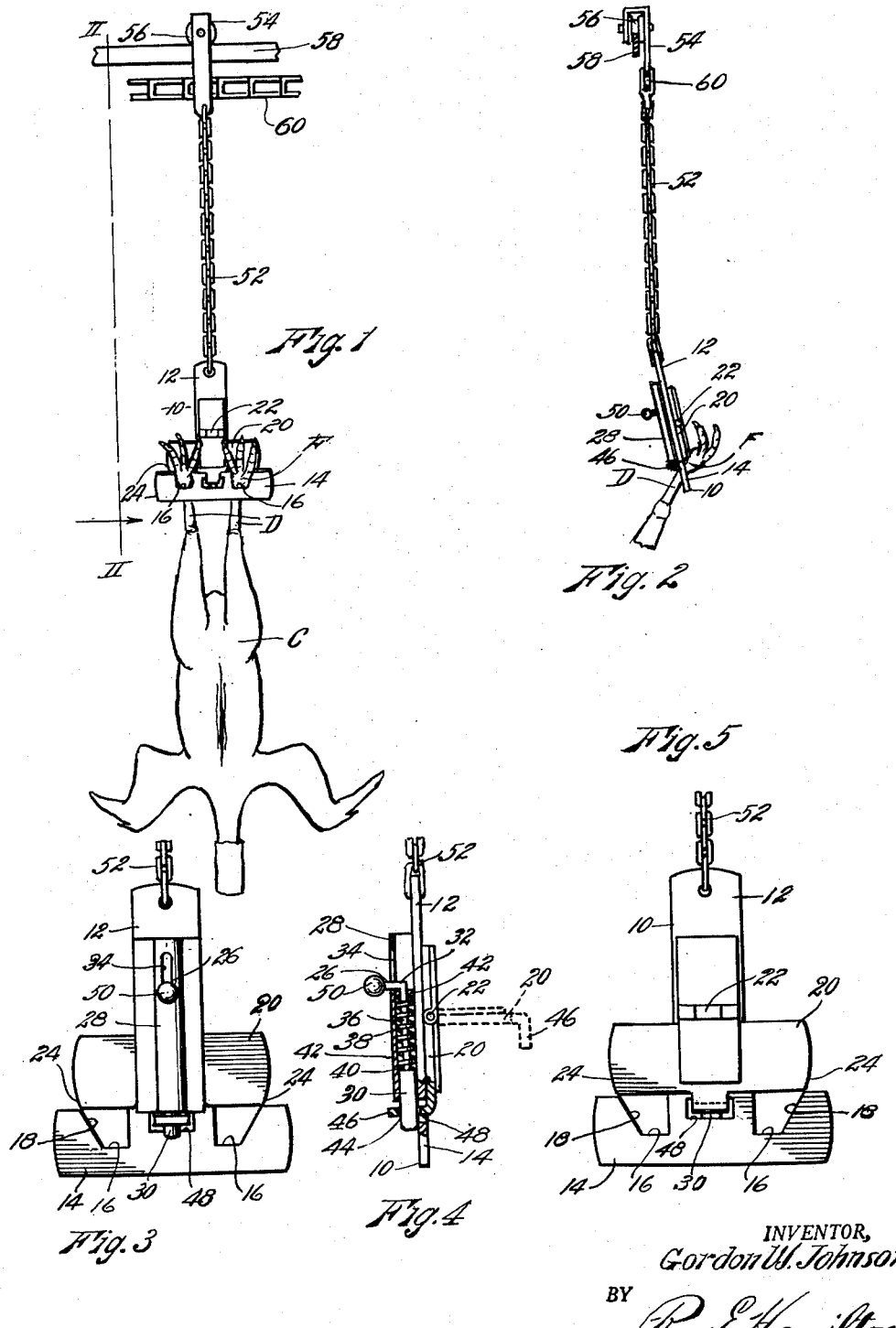
INVENTOR,
Gordon W. Johnson
BY Roy E. Hamilton,
Attorney.

Patented Dec. 12, 1950

2,533,941

UNITED STATES PATENT OFFICE 2,533,941

POULTRY SHACKLE

Gordon W. Johnson, Raytown, Mo., assignor to Gordon Johnson Company, Kansas City, Mo., a corporation of Missouri Application February 12, 1945, Serial No. 577,561

4 Claims. (Cl. 17—44.1)

1

This invention relates to improvements in poultry shackles which are specially suitable for use on conveyor lines.

The principal object of the invention is the provision of a poultry shackle that is adapted to securely engage the legs of the fowl regardless of the position of the fowl during the picking operation.

Another object of the present invention is the provision of a poultry shackle having latch means whereby the leg engaging jaws are secured in the closed position.

Other objects are simplicity and compactness of construction, ease and efficiency of operation and adaptability for use in supporting poultry of various sizes and weights.

With these objects in view, as well as other objects which will appear during the course of the specification, reference will now be had to the drawing, wherein:

Figure 1 is a rear elevational view of a poultry shackle embodying this invention and shown in operative relation on a poultry conveyor line.

Figure 2 is a sectional view taken on line II—II of Fig. 1.

Figure 3 is an enlarged front elevational view of the shackle detached from the conveyor line.

Figure 4 is an edge view of the shackle, partially broken away, with the hinged jaw shown raised in dotted lines.

Figure 5 is an enlarged rear elevational view of the shackle.

Throughout the several views like reference characters refer to similar parts and the numeral 10 comprises an inverted T-shaped member having an elongated body portion 12 and a cross head constituting a fixed jaw 14. At opposite sides of the body portion the jaw 14 is vertically notched at 16 to receive the respective legs D of the fowl to support the same in a depending position. These notches may be spaced apart any suitable distance and are preferably equi-distant from the body portion 12, which, when in the operative position, is disposed substantially vertical as shown.

It will be noted that the outer walls 18 of the notches 16 are outwardly and upwardly diverging whereby the fowl's legs are easily moved to and from position in said notches. A hinged jaw or gate 20 is mounted in parallel relation above jaw 14 and normally operates by gravity to close the notches 16, as clearly shown in the various figures. Hinge 22 welded or otherwise secured to the parts is of the strap-type and serves to maintain the gate 20 in proper relation to the

2 fixed jaw. The outer ends of the hinged jaw are rounded at 24 and extend to the outer edges of the adjacent notches 16 so as to substantially close the notches to secure the fowl's legs therein against accidental displacement and further serve as guides to direct the fowl's legs to the notches 16 when the hinged gate is partially raised during the placing of the legs in the shackle.

Referring to Figs. 1 and 2, it will be observed that the fowl's legs are so positioned in the shackle as to cause the weight of the bird to exert a pressure against the hinged jaw in such a manner as to urge it to the closed position against the body portion 12. This structure will normally secure the fowl's legs against displacement from the notches under ordinary conditions. However, during certain of the operations in handling the fowl, for instance, when the fowl is mounted in the shackle and carried by a conveyor belt or otherwise moved relative to the shackle, it is possible that the shackle might at times be so positioned that the hinged latch might be caused to open to release the fowl's legs. In order to preclude any chances for dislodgment of the legs from the shackle, a manually operable latch 26 is mounted on the front face of the body portion and comprises a housing 28 welded or otherwise secured to the body member 12 in which is mounted a bolt 30 having an outturned portion 32 which extends through a slot 34 formed in housing 28. The body of bolt 32 is reduced at 36 and carries a compression spring 38 which rests against the shoulder 40 of the bolt and the wall 42 of housing 28. This bolt 30 normally protrudes from housing 28 to extend through an opening 44 formed through a transverse tongue 46 integral with hinged jaw 20. When the shackle is in the closed position, as shown in Figs. 3, 4, and 5, tongue 46 projects through an opening 48 formed through the fixed jaw 14 and the compression spring 38 normally urges bolt 30 through opening 44 to maintain the shackle closed. However, the knob 50 on bolt 30 may be contacted by the operator to raise said bolt from the securing position to release the hinged jaw so that the fowl's legs may be placed in notches 16. When the hinged gate 20 is moved from the position shown in dotted lines as shown in Fig. 4 to the position shown in solid lines, the operator releases knob 50 and permits the bolt to again move to the securing position.

Without any material change in the operation of the device the lower end of bolt 30 might be angled to permit automatic latching of the parts as is usually had in the ordinary door latch. It will be noted that the shackle is shown supported by a chain 52 which in turn is fastened to a carriage 54 having a grooved wheel 56 which rides on a track 58. A chain drive 60 secured to the carriage 54 moves the shackle in the proper direction and at the desired rate of speed for carrying on the various operation. When the chicken C is positioned as shown in Fig. 1, with the legs passing through notches 16, the feet of the fowl will be positioned at the rear of the shackle, tending to close the hinged jaw 20 and furthermore, due to the angled relation of the legs and the weight of the fowl's body, the shackle member will be slightly inclined from the vertical as shown in Fig. 2. This position of the shackle with relation to the chicken legs, insures a maximum of pressure against the lower rear edge of jaw 20, and also the foot F of the fowl is much larger in cross section than the lower leg so that fowls of substantially any size may be safely mounted in the same shackle.

It is apparent that I have disclosed an inexpensive and simple poultry shackle that will securely engage and hold the legs of the fowl against accidental displacement regardless of the relative position of the fowl to the shackle.

Many minor changes may be made in the size and arrangement of the parts without departing from the spirit of the invention.

Having thus described my invention, what I claim as new and desire to be secured by Letters Patent is:

1. A poultry shackle comprising an inverted T-shaped member having a horizontal head and a vertical body portion suspended on a flexible support and having the upper edges of the head of said member having notches at opposite sides of the body thereof to receive the legs of a fowl, a jaw hingedly mounted on one side of said T-shaped member and adapted to normally close said notches, a manually operable spring bolt latch mounted on the opposite side of said T-shaped member and a perforated tongue integral with and extending transversely of said hinged jaw and adapted to extend through an opening formed through said T-shaped member whereby to be engaged by said bolt latch to secure the hinged jaw in the closed position.

2. A poultry shackle comprising an inverted T-shaped member having a body portion adapted to be suspended at its upper end and a substantially horizontal head portion, said head portion having a notch formed in the upper edge thereof to receive the legs of poultry, and a jaw member hinged at its upper edge to said body portion and the lower edge of which is adapted to overlie the opening of said notch to secure the poultry legs therein, said jaw thereby being movable to its notch closing position by gravity.

3. A poultry shackle comprising an inverted T-shaped member having a body portion adapted to be suspended at its upper end and a substantially horizontal head portion, said head portion having a notch formed in the upper edge thereof at each side of said body portion to receive the legs of poultry, and a unitary jaw member hinged at its upper edge to said body portion and the lower edge of which is adapted to overlie the openings of both of said notches to secure the poultry legs therein, said jaw thereby being movable to its notch closing position by gravity.

4. A poultry shackle comprising an inverted T-shaped member having a body portion adapted to be suspended at its upper end and a substantially horizontal head portion, said head portion having a notch formed in the upper edge thereof at each side of said body portion to receive the legs of poultry, and a unitary jaw member hinged at its upper edge to said body portion and the lower edge of which is adapted to overlie the openings of both of said notches to secure the poultry legs therein, said jaw thereby being movable to its notch closing position by gravity, and a manually releasable latch operable to normally secure said hinged jaw in the notch closing position.

GORDON W. JOHNSON.

REFERENCES CITED

The following references are of record in the file of this patent:

UNITED STATES PATENTS

| Number | Name | Date |
|---|---|---|
| 877,717 | Jones | Jan. 28, 1908 |
| 925,993 | Chapman | June 22, 1909 |
| 972,416 | Townsell | Oct. 11, 1910 |
| 1,825,018 | Smith | Sept. 29, 1931 |
| 2,152,083 | Onorato et al. | Mar. 28, 1939 |
| 2,335,993 | Bland et al. | Dec. 7, 1943 |